(12) United States Patent
    Laflin (10) Patent No.: US 9,936,638 B2
(45) Date of Patent: Apr. 10, 2018

(54) LAWN DEBRIS BLOWER BAGGING SYSTEM

(71) Applicant: Ed Laflin, Worcester, MA (US)

(72) Inventor: Ed Laflin, Worcester, MA (US)

( * ) Notice: Subject to any disclaimer, the term of this patent is extended or adjusted under 35 U.S.C. 154(b) by 0 days.

(21) Appl. No.: 15/394,870

(22) Filed: Dec. 30, 2016

(65) Prior Publication Data

US 2017/0188516 A1    Jul. 6, 2017

Related U.S. Application Data

(60) Provisional application No. 62/273,716, filed on Dec. 31, 2015.

(51) Int. Cl.
    *A47L 9/14*    (2006.01)
    *A01D 43/063*    (2006.01)

(52) U.S. Cl.
    CPC ............ *A01D 43/0636* (2013.01); *A47L 9/14* (2013.01); *A47L 9/1427* (2013.01); *A47L 9/1436* (2013.01)

(58) Field of Classification Search
    CPC ........ A47L 9/14; A47L 9/1427; A47L 9/1436; A01D 43/0636
    USPC .............................................. 15/347, DIG. 8
    IPC ......................................................... A47L 9/14
    See application file for complete search history.

(56) References Cited

U.S. PATENT DOCUMENTS

| | | | |
|---|---|---|---|
| 1,211,740 A | 1/1917 | Morton | |
| 3,522,695 A | 8/1970 | Musgrave | |
| 3,611,685 A | 10/1971 | Allina | |
| 4,499,713 A | 2/1985 | Stone | |
| 5,042,241 A | 8/1991 | Boylston | |
| 5,564,265 A | 10/1996 | Pitt | |
| 5,690,253 A * | 11/1997 | Lafleur | B66C 1/226 222/102 |
| 6,810,652 B1 | 11/2004 | Lee | |
| 7,490,787 B1 | 2/2009 | Salazar | |
| 7,546,989 B1 | 6/2009 | Lineberry | |
| 7,815,152 B2 | 10/2010 | Campbell | |
| 8,882,350 B2 | 11/2014 | Cheney | |
| 9,084,393 B1 | 7/2015 | Singleton | |
| 2002/0100844 A1 | 8/2002 | Green | |
| 2003/0131435 A1 | 7/2003 | Madhat | |
| 2008/0052869 A1 | 3/2008 | Fanning | |

* cited by examiner

*Primary Examiner* — David Redding
(74) *Attorney, Agent, or Firm* — Bay State IP, LLC (57) ABSTRACT

A debris collection system to be attached to a leaf blower apparatus to assist in the collection of lawn debris like leaves, sticks, acorns, fruit, trash, etc. The debris collection system includes a bagging assembly with a flexible bag that collects the debris. The bagging assembly also includes a handle mechanism to allow for the emptying of the flexible bag into a trash bin. The system also includes attachment mechanisms that allow the debris collection system to be easily attached and detached from the leaf blower.

12 Claims, 7 Drawing Sheets

LAWN DEBRIS BLOWER BAGGING SYSTEM

CROSS REFERENCE TO RELATED APPLICATION

This application claims the benefit of and takes priority of U.S. Provisional Application No. 62/273,716 filed on Dec. 31, 2015, the contents of which are herein incorporated by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

Field of the Invention

The present invention relates to leaf collection systems and, more particularly, to a lawn debris blower bagging system.

Description of the Related Art

Lawn maintenance is a tedious activity that is time consuming. One of the more weary and time consuming tasks is removing lawn debris from the landscape including leaves, acorns, small branches, nuts, pinecones, liter, etc. Removing these items is vital to help maintain a healthy lawn, as well as, prevent damage to landscaping devices like mowers.

In addition, the autumn season fills many yards with an abundance of leaves and other debris. Homeowners and landscapers are typically required to remove this debris before they can mow a lawn. Others, even if they do not want to mow, do not appreciate their lawns covered by debris that can ultimately damage the lawn and be an eyesore.

Lawn debris includes more than just leaves that fall during the autumn season. Through the course of the seasons, changing weather patterns, and every day wear and tear, lawns can collect a plethora of items including branches, acorns, nuts, pine cones, fruit, stones and rocks, animal excrements, litter, glass, etc. Many of these items, if not removed from a lawn, can cause major damage to machinery like mowers, lawn blowers, and lawn vacuums. Other objects may be dangerous to children, guests, and pets. Additionally, some of the above stated items can ruin a lawn by killing the grass and turning some lawns into sloppy messes. Thus, lawn debris removal is a necessary chore for many homeowners and landscapers.

Various methods exist for leaf collection including raking and sweeping mechanisms to gather leaves and other debris into a manageable area to transfer into a bin or bag. It is very difficult and time consuming to pick up and stuff leaves into containers, such as plastic bags, however, and the repetitive process week after week in the autumn season becomes a significant chore for homeowners and others alike.

Other methods, which have proved to be easier than raking, include the use of blower and vacuum devices to deposit leaves into bags or other containers. Leaves can be sucked into a blower device and then discharged into a bag. Further, many of these methods breaks up and mulches the leaves allowing them to be easily compacted. These devices are unable to suck up other lawn debris and users are left to again gather other debris like branches, litter, acorns, nuts, fruit, etc. by hand. Further, users also must be careful when sucking up the leaves with blower devices to ensure that other lawn debris are not captured because these items can damage the leaf blower or vacuum, usually requiring a user to replace the machine or pay for costly repair.

High-powered vacuum devices sometimes allow for the pickup of other lawn debris besides leaves, however these devices tend to be large in size, heavy, and expensive. Most of these devices need to be attached to a lawn tractor or mower in order to be utilized and work best on level ground.

SUMMARY OF THE INVENTION

The instant series of system, method and series of apparatuses, as illustrated herein, are clearly not anticipated, rendered obvious, or even present in any of the prior art mechanisms, either alone or in any combination thereof. Thus, the several embodiments of the instant system are illustrated herein.

In one aspect, the present invention provides a new lawn debris blower bagging system, which includes a bagging mechanism which attaches to the front of a leaf blower. Another aspect of the present invention provides a new lawn debris blower bagging system that is lightweight. In another aspect, the invention provides a new lawn debris blower bagging system that is inexpensive. In another aspect, the invention provides a new lawn debris blower bagging system that is easily maneuverable and efficient in lawn debris collection.

Realizing one aspect of the invention is a lawn debris blower bagging system that provides an easily attachable bagging mechanism that is lightweight, inexpensive, easily maneuverable and efficient and is capable of collecting a variety of lawn debris including leaves, branches, acorns, nuts, pine cones, fruit, stones, animal feces, and litter.

The subject mechanism features a lawn debris blower bagging system that includes a bagging assembly, a handle mechanism, and an attachment mechanism for removable attachment to a leaf blower.

In one embodiment, the bagging system includes a flexible bag with an open end and a closed end to capture lawn debris that is blown into the flexible bag by the leaf blower. The overall handle mechanism includes the attachment mechanism, which allows the bagging system to be easily attached to a lawn blower for use. The system is also easily detachable for when a user does not wish to utilize the bagging system.

The bagging system includes a mesh-like bag that is sturdy and air permeable. The porous surface of a mesh bag allows for loose materials to be captured by a leaf blower without causing the bag to fill with air and balloon out.

The attachment mechanism includes a pivot hinge mechanism that also allows for the flexible bag to easily pivot, allowing for a user to easily empty all of the contents from the bag assembly to containers, such as plastic bags or trash bins.

The overall handle mechanism includes two extending arm structures that are attached to the pivot hinge. These arms provide the framed structure of the lawn debris bagging system. The arm structures also connect to the attachment mechanism, which later attaches to the leaf blower by utilizing at least one mounting strap.

When fully assembled, a user may utilize the leaf blower and blow loose materials into the bag assembly. Because the flexible bag is comprised of a porous surface, the air movement from the blower will not fill the bag with air or have it blow out. Instead, the air movement will move through the bag while still capturing the loose materials. When the user has completed his collection or the bag assembly becomes full, the user is able to quickly and easily empty the bag's contents and continue cleaning his lawn.

The overall system is easy to attach, lightweight, inexpensive, easily maneuverable, and fast, providing the user an efficient method to clear his lawn of all types of lawn debris. The system provides an efficient way to sweep and collect lawn debris simultaneously. In addition, the overall system collects all types of lawn debris and is not limited to just leaf collection. Furthermore, the overall system harvests nuts and fruits without damage and works well in all types of turf and grass environments.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

To the accomplishment of the foregoing and related ends, certain illustrative aspects are described herein in connection with the following description and the annexed drawings. These aspects are indicative of the various ways in which the principles disclosed herein can be practice and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

The invention may be more completely understood in consideration of the following detailed description of the various embodiments of the invention in connection with the accompanying drawings, in which.

DETAILED DESCRIPTION OF THE SEVERAL EMBODIMENTS

The detailed description set forth below in connection with the appended drawings is intended as a description of presently-preferred embodiments of the apparatus and does not represent the only forms in which the present apparatus may be constructed and/or utilized. The description sets forth the functions and the sequence of steps for constructing and operating the apparatus in connection with the illustrated embodiments. However, it is to be understood that the same or equivalent functions and sequences may be accomplished by different embodiments that are also intended to be encompassed within the spirit and scope of the invention.

For the following defined terms, these definitions shall be applied, unless a different definition is given in the claims or elsewhere in this specification. All numeric values are herein assumed to be modified by the term "about", whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following description should be read with reference to the drawings wherein like reference numerals indicate like elements throughout the several views. The drawings, which are not necessarily to scale, depict illustrative embodiments of the claimed invention.

Figure 1:
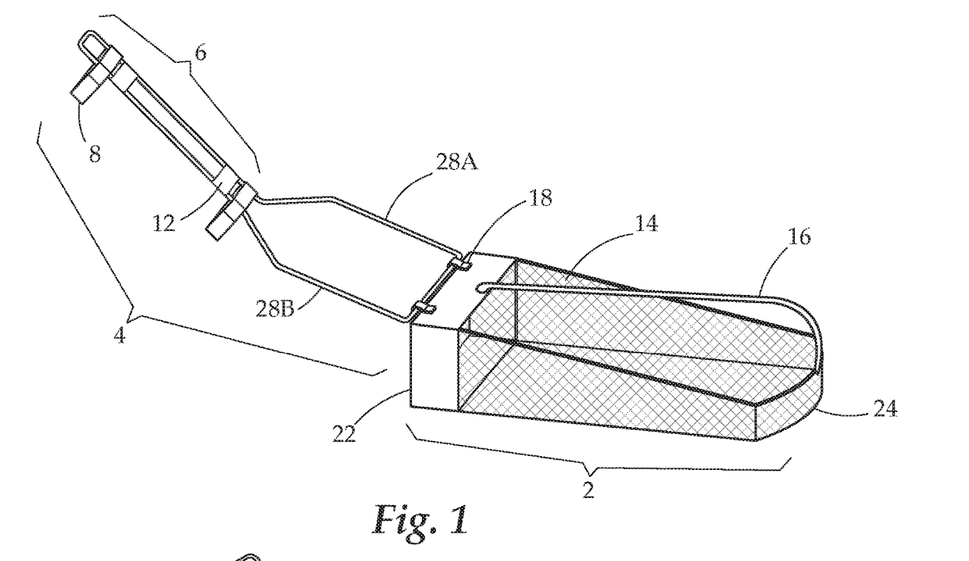
FIG. 1 illustrates a side perspective view of one embodiment of the lawn debris blower bagging system.
Figure 2:
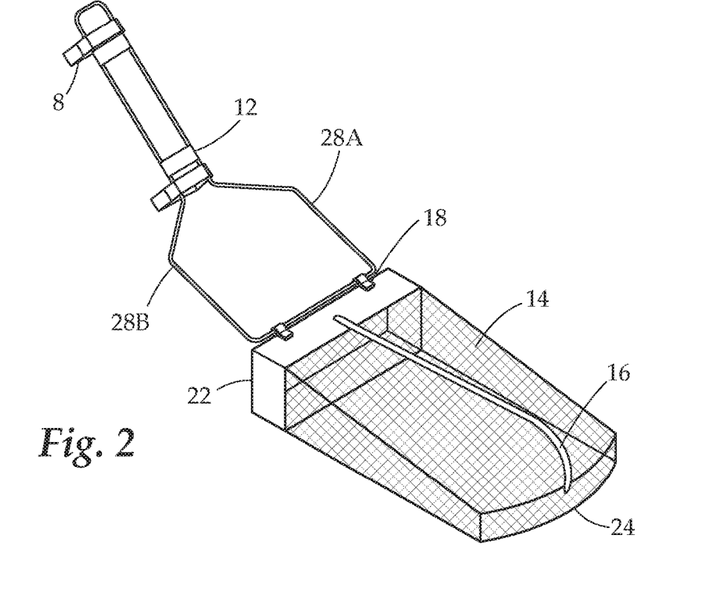
FIG. 2 illustrates front perspective view of one embodiment of the lawn debris blower bagging system.
Figure 3:
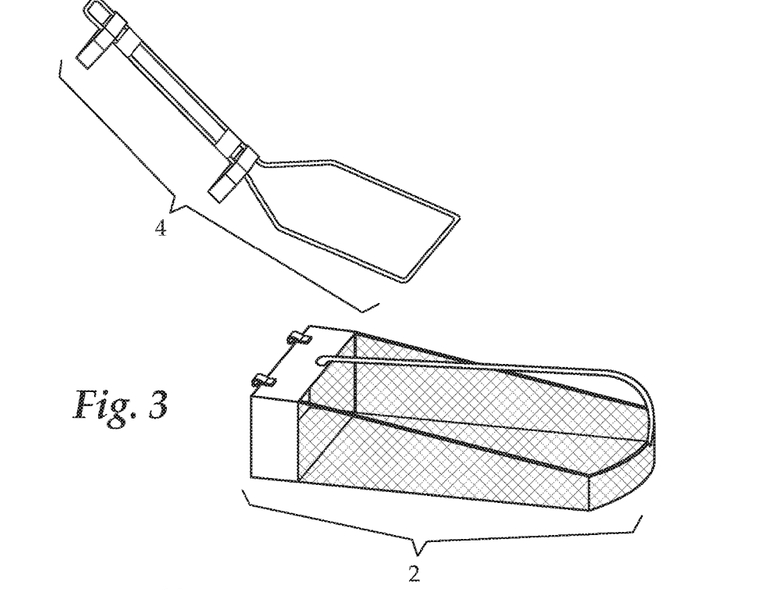
FIG. 3 illustrates a side perspective exploded view of one embodiment of the lawn debris blower bagging system.

Referring now to the figures to better illustrate the present system, in FIGS. 1-2, there is shown one embodiment of the debris collection system 10. FIG. 3 illustrates the lawn debris blower bagging system in a preferred embodiment as attached to a leaf blower device. In one embodiment, the debris collection system may comprise a bagging assembly 2, a handle mechanism 4, and an attachment mechanism 6 for removable attachment to a leaf blower apparatus 20.

As seen in FIGS. 1 and 2, in a preferred embodiment of the lawn debris blower bagging system 10, having a flexible bag 2 with an open end 22 and a closed end for capturing loose material, such as leaves that are blown into the flexible bag. At least one pair of attachment hinge mechanisms 18, located at the top of the open end 22 of the flexible bag 14 may be capable for securely supporting the flexible bag 14 to the overall handle mechanism 4. The attachment hinge mechanism may include a P-clip hinge to allow the flexible bag 14 to easily pivot.

While the lawn debris blower bagging system 10 may be used with any size or type of flexible bag, the system is preferably provided with a mesh bag formed of a woven material which is sturdy and air permeable (as seen in FIGS. 1-3 as the flexible bag 14). The porous surface of the flexible bag 14 allows for loose materials such as lawn debris like sticks, rocks, acorns, pine cones, etc. to be blown into the flexible bag 14 by a handheld leaf blower 20 without causing the bag to fill with air and balloon out.

In one embodiment, the flexible bag 14 further comprises a handle mechanism 16. The handle mechanism 16 allows for easy user maneuverability and transportation. Further, when the lawn debris blower bagging system is in use, the user may grab the handle 16, while it is still attached to a leaf blower, and pivot the bag on its attachment hinge mechanism 18 to empty the contents within the bag.

In yet another embodiment, the handle mechanism 4 comprises of two extending arm structures 28a and 28b that are in communication with the attachment hinge mechanism 18 attached to the flexible bag 14. The framed structure may be made from metal tubes. The overall handle mechanism 4 also comprises the attachment mechanism 6.

In one embodiment, as seen in FIGS. 1 and 2, the attachment mechanism 6 is part of the overall handle mechanism 4. The attachment mechanism 6 may also comprises of at least one mounting straps 8. The mounting straps may be hook and loop strap design. The mounting strap 8 may be made from Velcro® or other suitable material.

FIG. 3 illustrates an exploded view of the blower bagging system. Herein, the view shows the bagging system 2 unattached to the overall handle mechanism 4.

Figure 4:
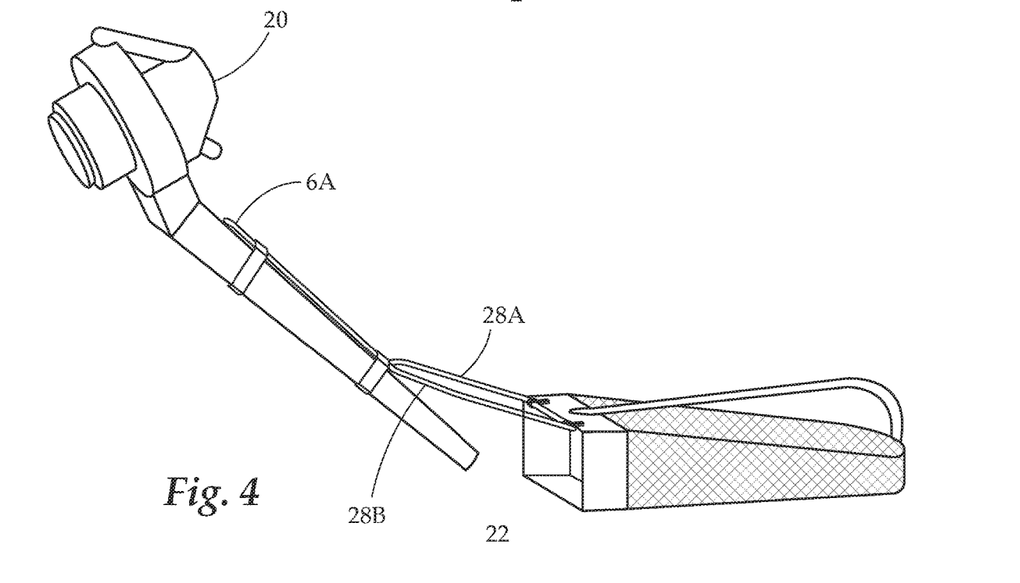
FIG. 4 is a perspective view of one embodiment of the lawn debris blower bagging system assembled for use to a leaf blower apparatus.

Turning to FIG. 4, in one embodiment, the attachment mechanism 6 is in communication with a handheld leaf blower 20. Here, in a preferred embodiment, the mounting straps 8 are made from Velcro and secure the lawn debris blower bagging system 10 to the handheld leaf blower 20. When fully assembled, a user may utilize the leaf blower and blow loose materials such as lawn debris into the flexible bag 14. Because the flexible bag is comprised of a porous surface, the air movement from the blower will not fill the bag with air or have it blow out. Instead, the air movement will move through the bag while still capturing the loose materials.

In one embodiment, shown in FIG. 4, the lawn debris blower bagging system 10 is in communication with the leaf blower 20 by the handle mechanism 4. The handle mechanism comprises an attachment mechanism 6 and two extending arm structures 28a, 28b. The attachment mechanism 6 comprises of a contact surface portion 6a which is oriented in direct contact with the leaf blower 20. The extending arm structures 28a, 28b have a non-contact surface portion and are not oriented in direct contact with the leaf blower. Instead, the extending arm structures extend outwardly and upwardly away from the attachment mechanism 6. In one embodiment, the flexible bag 14 is oriented parallel to the surface of the ground surface 40.

Figure 5:
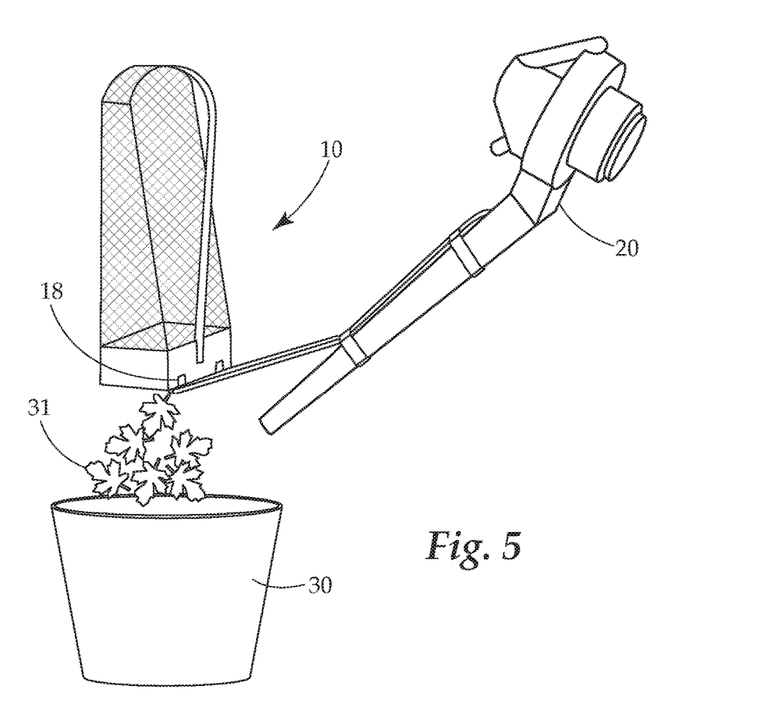
FIG. 5 illustrates a perspective view of the lawn debris blower bagging system assembled for use and utilizing the pivot mechanism.

FIG. 5 illustrates another embodiment of the lawn debris blower bagging system 10 utilizing the hinge mechanisms 18 in order to empty collected debris 31 into a barrel 30 or trash bin. A user is able to use the handle mechanism 4 to pivot the hinge mechanism into an emptying position as seen in FIG. 5 to empty any debris in the flexible bag 14.

Figure 6:
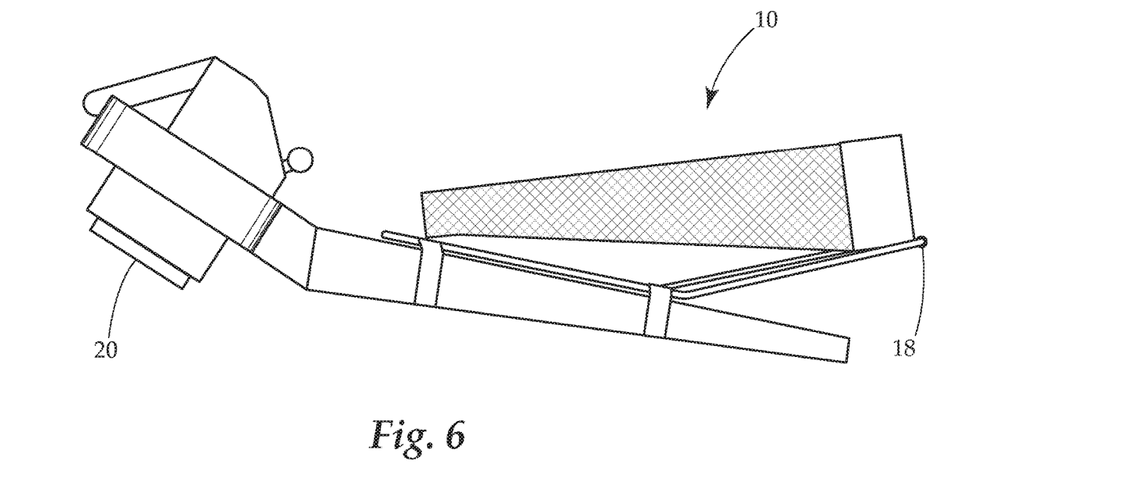
FIG. 6 illustrates a perspective view of the lawn debris blower bagging system assembled for use and utilizing the pivot mechanism, wherein a bagging assembly affixes to the leaf blower when not in use.

FIG. 6 illustrates another embodiment of the lawn debris blower bagging system 10 utilizing the hinge mechanisms 18 wherein the bagging assembly fully pivots back and may be affixed to the leaf blower 20. A user is able to fully pivot the bagging assembly back using the pivot mechanisms and affix or tie back the bagging assembly when the bag is not in use. This feature allows the user to use the leaf blower in a normal manner without having to remove the system. The user can convert back and forth, utilizing the bagging system as needed in a matter of seconds.

Figure 7A:
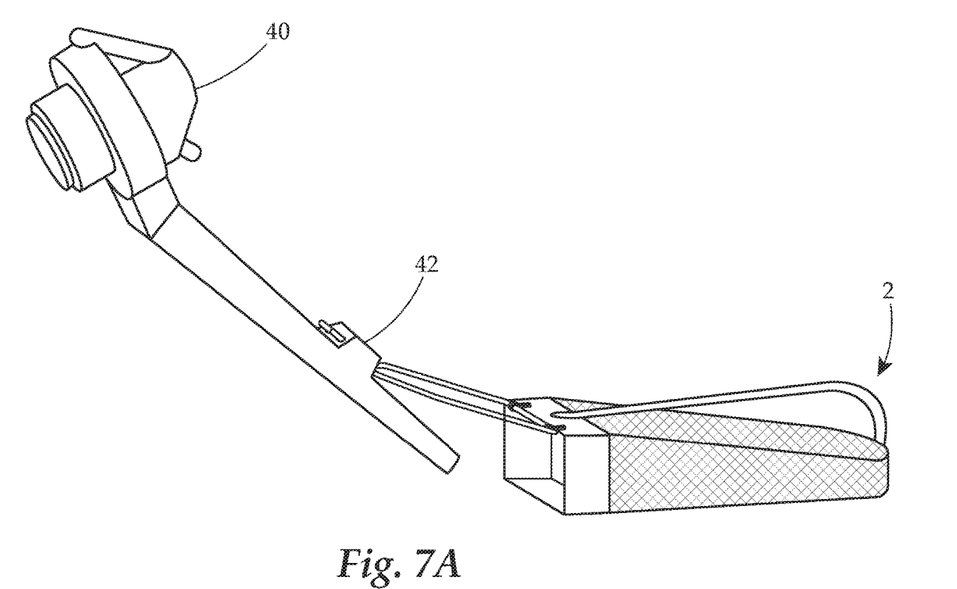
FIGS. 7a and 7b illustrate a perspective view of yet another embodiment of the lawn debris blower bagging system.
Figure 7B:
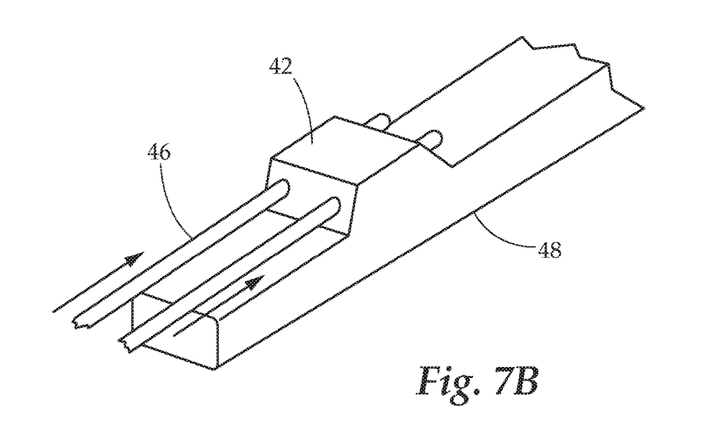

FIGS. 7a and 7b illustrate yet another embodiment of the lawn debris blower bagging system utilizing a leaf blower device 40 constructed with a mounting mechanism 42. The mounting mechanism 42 is molded into the air blower tube 48 of the leaf blower device 40. Herein, the bagging system 2 includes a handle assembly 46 that may be affixed or snapped into the built-in mounting mechanism 42 of the leaf blower device 40.

Figure 8A:
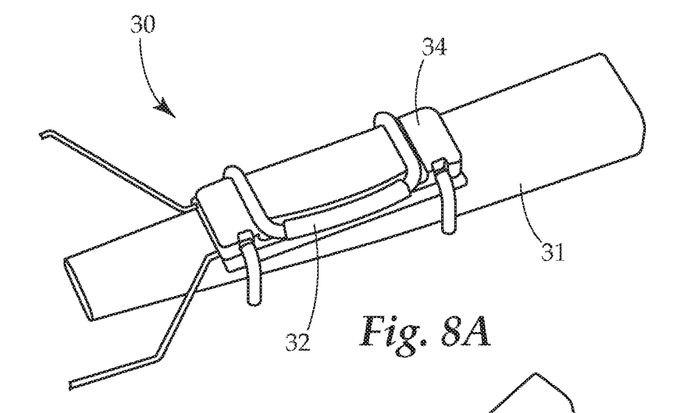
FIGS. 8A-8C illustrate a series of perspective views of yet another embodiment of the lawn debris blower bagging system, highlighting an alternative embodiment of an attachment mechanism used to affix the lawn debris system to a leaf blower apparatus.
Figure 8B:
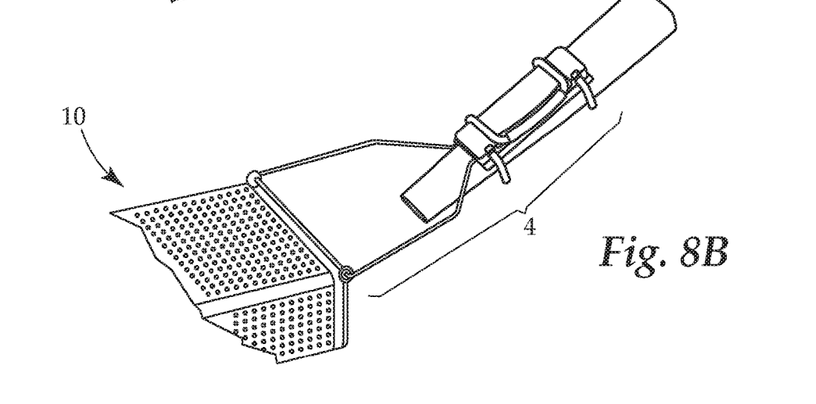
Figure 8C:
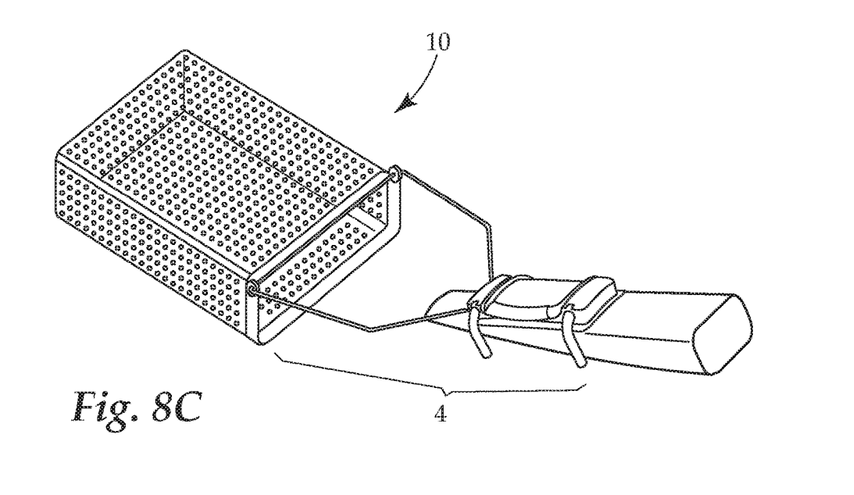

Turning now to FIGS. 8A-8C, which illustrate an alternative embodiment of the attachment mechanism 30 to affix the debris collection system 10 to the leaf blower device. Herein, the attachment mechanism 30 comprises of a sleeve device 34 and a locking arm mechanism 32. The sleeve device 34 slips over the air blower 31. Then, the locking arm mechanism 32 locks the sleeve device into place to securely affix the lawn debris collection system 10 to the leaf blower. The sleeve mechanism 34 may be adjusted to accommodate a variety of different widths of the air blower 31 of the leaf blower device.

Figure 9A:
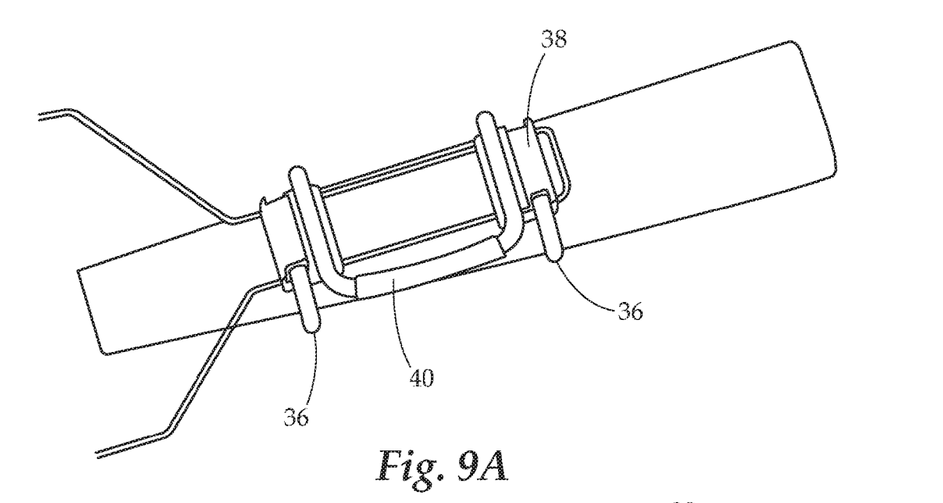
FIGS. 9A and 9B illustrate a perspective view of yet another embodiment of an alternative of the attachment mechanism used to affix the lawn debris system to a leaf blower apparatus.
Figure 9B:
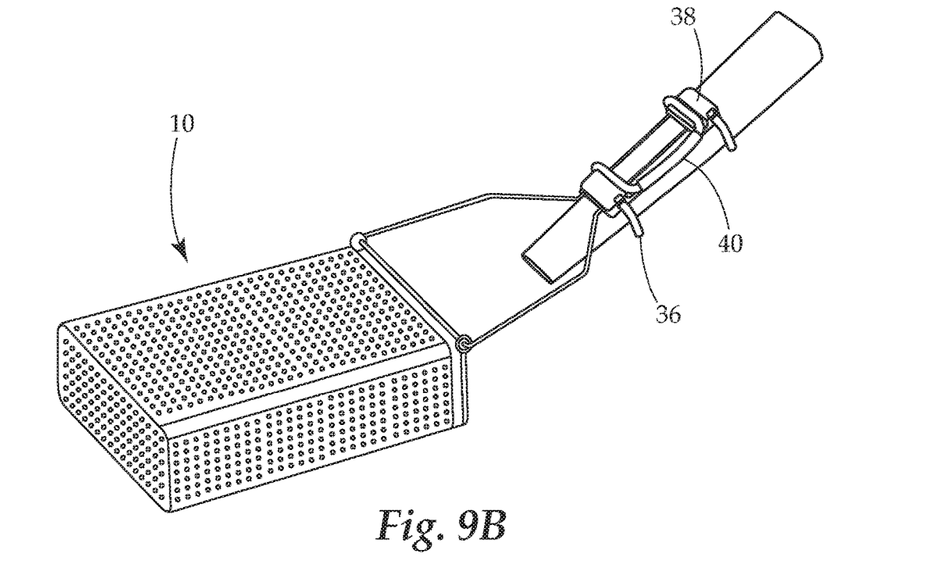

FIGS. 9A and 9B illustrate yet another embodiment of the attachment mechanism 36 to affix the debris collection system 10 to the leaf blower device. Herein, similar to the attachment mechanism illustrated in FIGS. 8A-8C, show an additional embodiment of a sleeve device 38 that slips over the air blower of a leaf blower device and locks in place through the use of a locking arm mechanism 40. The sleeve device may be adjusted to accommodate a variety of different widths of the air blower.

Figure 10A:
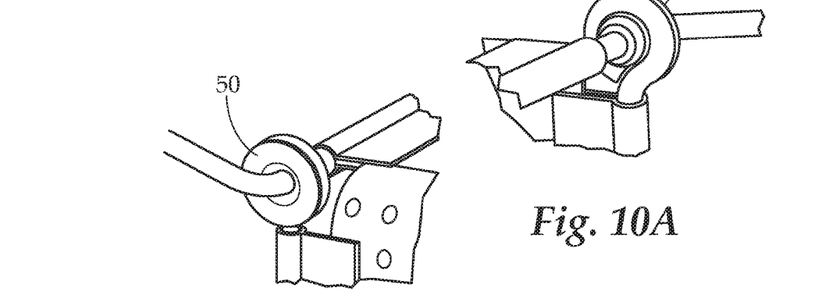
FIGS. 10A and 10B illustrates an enlarged perspective view of one embodiment of an rotation mechanism, which allows a user to easily empty the contents of a filled bag into a trash bucket; and, FIG. 11 illustrates a perspective view of yet another embodiment of the lawn debris blower bagging system, highlighting an alternative embodiment of an attachment mechanism used to affix the lawn debris collection system to a leaf blower apparatus.
Figure 10B:
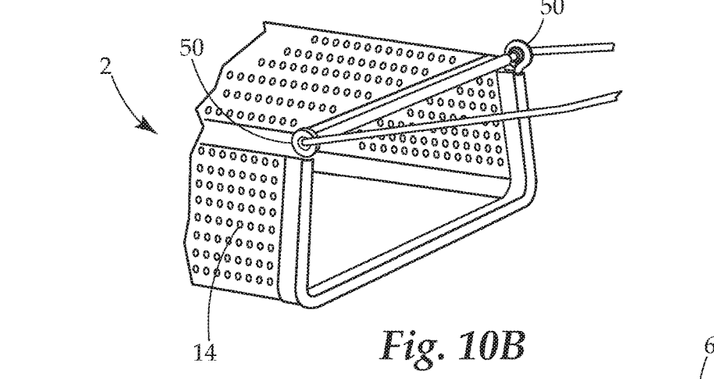

FIGS. 10A-10B illustrates yet another embodiment of the bagging assembly 2 of the lawn debris blower bagging system utilizing a rotation mechanism 50 in order to assist in emptying collected debris into a barrel or trash bin. Unlike the hinge mechanism 18 illustrated in FIG. 5, the rotation mechanism 50 is circular or oval in shape and allows the user to easily pivot the bagging assembly to an empty position as seen in FIG. 5 to empty any debris in the flexible bag 14 of the bagging assembly 2.

Figure 11:
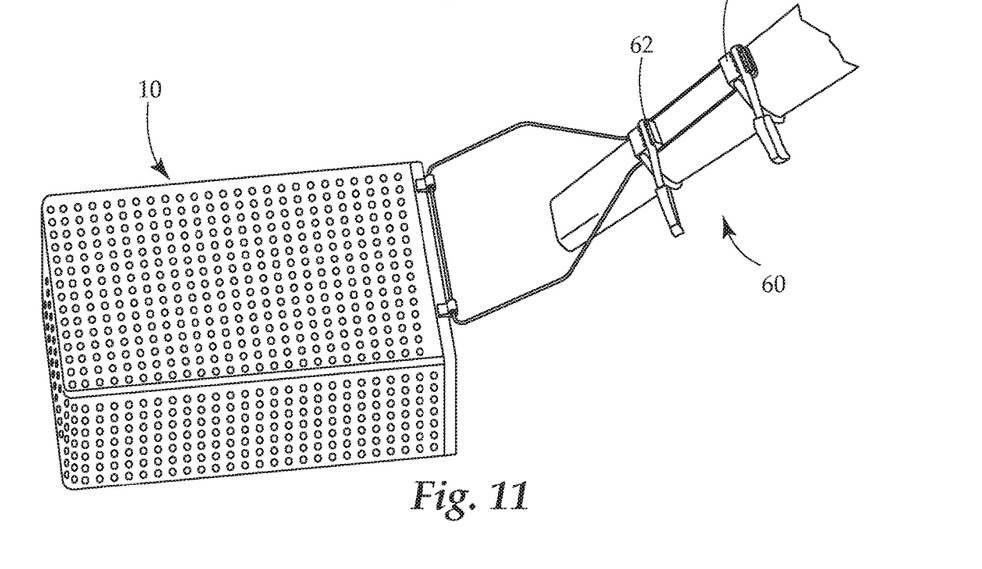

FIG. 11 illustrates yet another embodiment of the lawn debris blower bagging system with an additional embodiment of an attachment mechanism 60 used to affix the lawn debris system 10 to the leaf blower apparatus. Herein, the attachment mechanism comprises a bungee gripper tie-down apparatus 62 and locking mechanism 64 that locks the bungee gripper tie-down in place and securely affixes the lawn debris collection system to the blower apparatus.

Herein, in a preferred embodiment, the lawn debris blower bagging system may be utilized to collect a variety of debris that one may encounter in a yard or similar setting where the system is being utilized.

It should be understood that various alternatives to the embodiments of the disclosure described herein may be employed in practicing the disclosure. Elements of an implementation of the systems and methods described herein may be independently implemented or combined with other implementations. It is intended that the claims to follow with the utility application define the scope of the disclosure and that systems, methods, and devices within the scope of these claims and their equivalents be covered thereby.

What is claimed:

1. A debris collection system configured for use with a leaf blower apparatus comprising:
a bagging assembly, wherein the bagging assembly further comprises:
a flexible bag with an open end and a closed end,
at least one pair of attachment hinge mechanisms affixed to the open end of the flexible bag;
a handle mechanism affixed to the flexible bag; and,
an attachment mechanism to affix the debris collection system to the leaf blower apparatus.

2. The debris collection system of claim 1, wherein the flexible bag further comprises a mesh bag of woven material, wherein the mesh bag comprises a porous surface.

3. The debris collection system of claim 2, wherein the porous surface of the mesh bag is air permeable.

4. The debris collection system of claim 1, wherein the handle mechanism comprises two extending arm structures that are in communication with the at least one pair of attachment hinge mechanism.

5. The debris collection system of claim 1, wherein the attachment mechanism further comprises at least one mounting strap.

6. The debris collection system of claim 5, wherein the at least one mounting strap is selected from the design group consisting of hook and loop strap, Velcro, and bungee cord.

7. The debris collection system of claim 1, wherein the debris collection system is in communication with the leaf blower apparatus by use of an attachment mechanism.

8. The debris collection system of claim 1, wherein the handle mechanism pivots to orient the bagging assembly to an emptying position to empty any debris in the flexible bag.

9. The debris collection system of claim 4 wherein the attachment mechanism further comprises:
a contact surface portion which is oriented in direct contact with the leaf blower apparatus; and,
the extending arm structures comprise a non-contact surface portion and are not oriented in direct contact with the handheld leaf blower.

10. The debris collection system of claim 4, wherein the at least two extending arm structures extend outwardly and upwardly away from the attachment mechanism.

11. The debris collection system of claim 1, wherein the flexible bag is oriented parallel to a ground surface.

12. A debris collection system comprising:
a leaf blower apparatus;
a bagging assembly configured for use with the leaf blower apparatus, wherein the bagging assembly further comprises:
a flexible bag with an open end and a closed end,
at least one pair of attachment hinge mechanisms affixed to the open end of the flexible bag;
a handle mechanism affixed to the flexible bag; and,
an attachment mechanism to affix the debris collection system to the leaf blower apparatus.

* * * * *